United States Patent [19]
Blanchette

[11] 3,888,130
[45] June 10, 1975

[54] ROTATION RESPONSIVE VARIABLE DIAMETER PULLEY

[76] Inventor: Léon Blanchette, St. Nicephore, County of Drummond, Quebec, Canada

[22] Filed: Nov. 13, 1973

[21] Appl. No.: 415,309

[52] U.S. Cl. .......................................... 74/230.17 E
[51] Int. Cl. ............................................. F16h 55/22
[58] Field of Search ........................... 74/230.17 E

[56] References Cited
UNITED STATES PATENTS
3,605,511    9/1971    Deschene ................... 74/230.17 E Primary Examiner—Leonard H. Gerin

[57] ABSTRACT

A variable diameter drive pulley which is arranged to quickly respond to a variation in the speed of rotation of the driving elements thereof for improved acceleration and deceleration, for instance of a snowmobile on which it is conceived to be mounted instead of the driving variable diameter pulley of the centrifugal weight type. A drive pulley having an axially displaceable flange provided with cam surfaces and cooperating fingers adapted to engage the cam surfaces upon acceleration and to substantially disengage upon deceleration to allow quick widening of the space between the two flanges of the pulley, under the action of a biasing spring. Chains are provided to assist the retardation of the axially displaceable flange in the initial phase of acceleration.

7 Claims, 14 Drawing Figures

PATENTED JUN 10 1975 3,888,130

SHEET 1

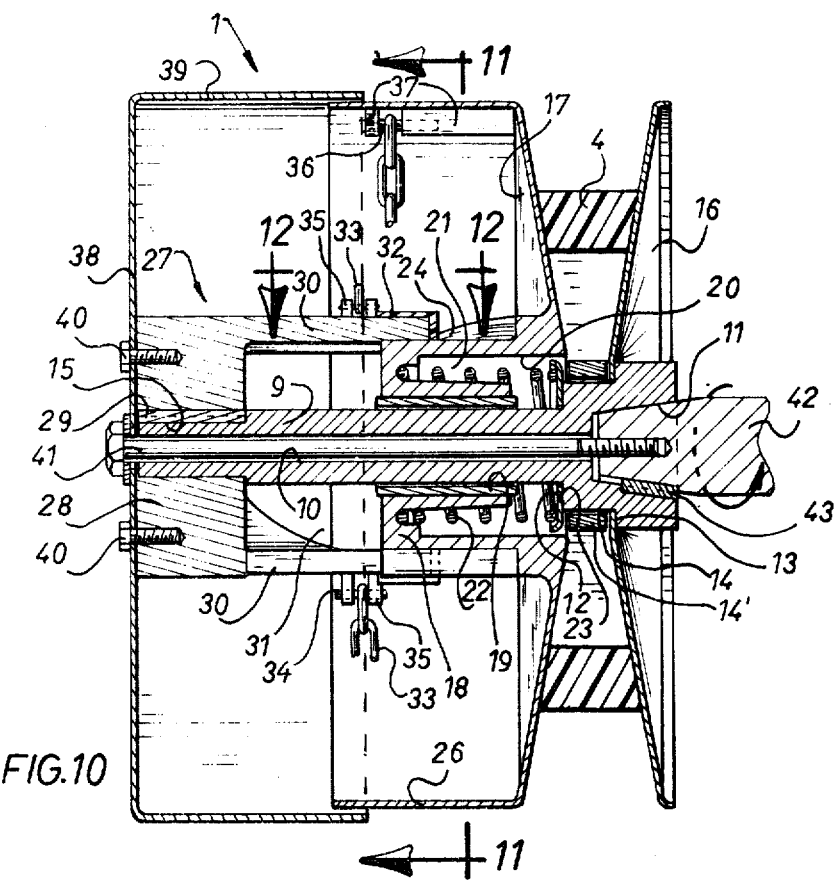
FIG.10
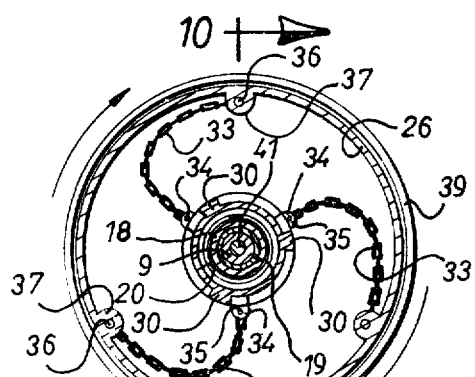
FIG.11
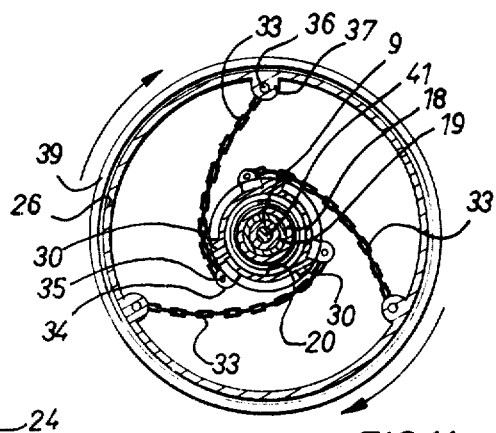
FIG.11a
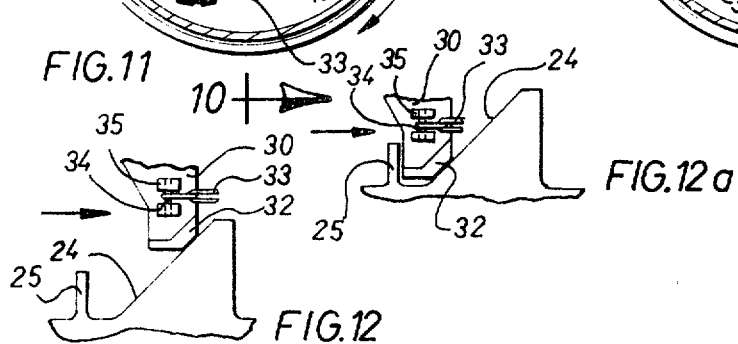
FIG.12
FIG.12a

ROTATION RESPONSIVE VARIABLE DIAMETER PULLEY

This invention relates to a variable diameter drive pulley adapted to be used in the transmission assembly of a snowmobile.

Most snowmobiles now produced or in use are provided with a rotation responsive variable diameter drive pulley which has weights arranged to respond to the centrifugal force thereon to control and actuate axial movement of one flange of the drive pulley. The response of such centrifugally-operated variable diameter drive pulleys is found relatively slow upon deceleration of the driving elements thereof, resulting in slow vehicle deceleration and also to produce belt slipping during acceleration and at low speed.

It is a general object of the invention to provide a variable diameter pulley adapted for use on a snowmobile and other vehicles and constructed and arranged to have an immediate response upon torque variation applied to the driving elements thereof.

It is another general object of the invention to provide a driving variable diameter pulley which is responsive to a variation of torque in addition to a variation of rotational speed.

It is a more specific object of the invention to provide variable diameter drive pulley having cam surfaces and cooperating fingers adapted to engage each other upon acceleration and to substantially disengage upon deceleration of the driving elements thereof and to allow in the latter case immediate widening of the belt recess between the two flanges of the pulley.

It is a further object of the invention to provide a torque responsive variable diameter drive pulley having one flange which is axially and rotatably movable relative to the other flange and centrifugally-operated chains connected to the one flange to assist the retardation thereof upon acceleration of the driving elements.

The invention will now be described with reference to a preferred embodiment which is illustrated, by way of example only, in the accompanying drawings, in which:

FIG. 10 is a longitudinal section of the assembled pulley, being cross-sectional view, as seen along line 10—10 in FIG. 11;

FIGS. 11 and 11a are cross-sectional views as seen along line 11—11 in FIG. 10 and showing the action of the chains in accelerated and decelerated positions respectively; and FIGS. 12 and 12a are schematic representations of a cam surface with an associated finger portion corresponding to the accelerated and decelerated positions of FIGS. 11 and 11a respectively.

Figure 1:
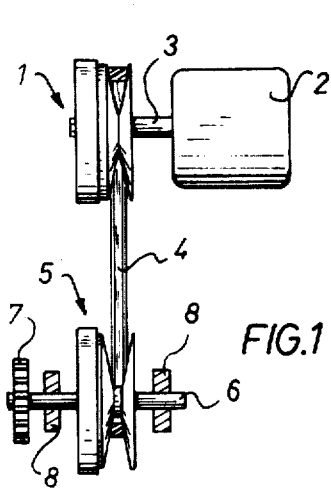
FIG. 1 is an elevational view of a driving arrangement, for example for a snowmobile, including a torque and speed responsive variable diameter drive pulley according to the invention.
Figures 2, 3:
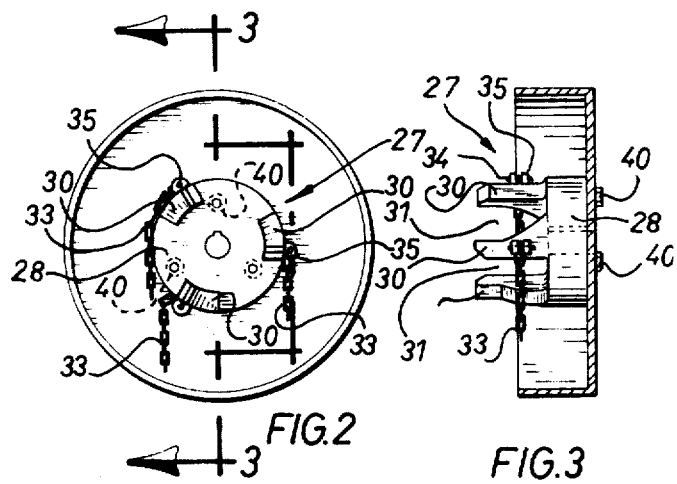
FIG. 2 is an axial view of a cover element and the associated parts for a pulley according to the invention.
FIG. 3 is a cross-sectional view as seen along line 3—3 in FIG. 2.
Figure 4:
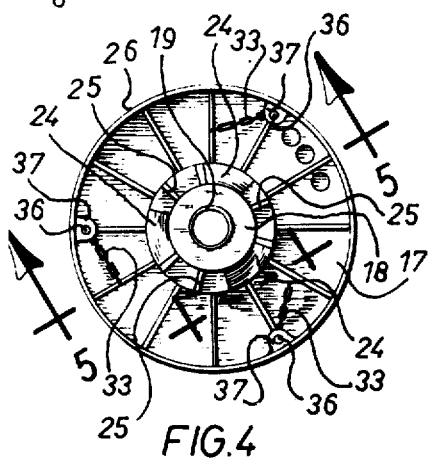
FIG. 4 is an axial view of a movable flange of the pulley and the associated parts.
Figures 5, 6:
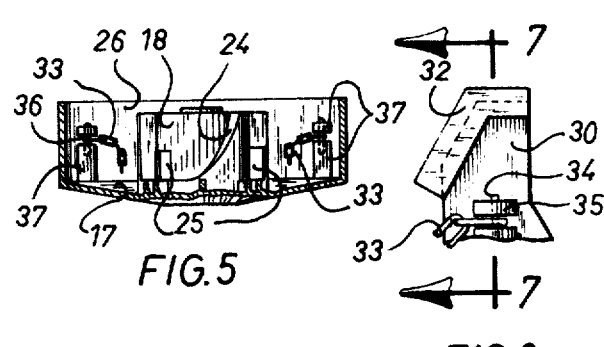
FIG. 5 is a cross-sectional view as seen along line 5—5 in FIG. 4.
FIG. 6 is a partial view of the free end of a finger portion.
Figure 8:
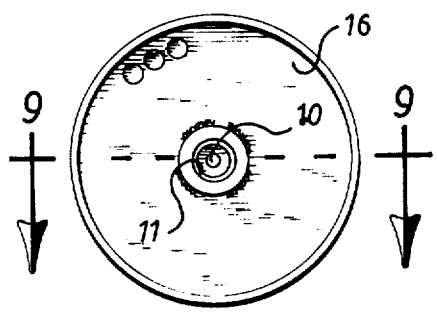
FIG. 8 is an axial view of the fixed flange of the pulley.
Figures 7, 9:
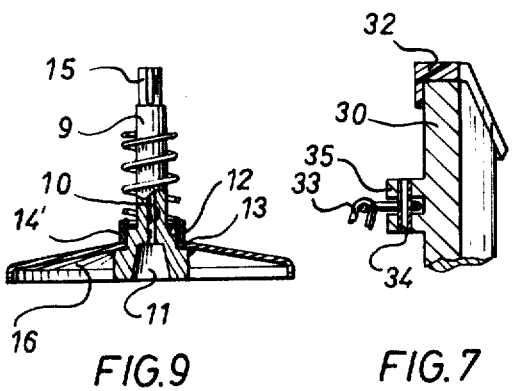
FIG. 7 is a cross-sectional view as seen along line 7—7 in FIG. 6.
FIG. 9 is a cross-sectional view as seen along line 9—9 in FIG. 8.

FIG. 1 illustrates the usual driving arrangement of a snowmobile in which a torque and speed responsive variable diameter drive pulley 1, according to the invention, is used in combination with other conventional elements such as a driving motor 2, a driving shaft 3, a V-belt 4, a variable diameter driven pulley 5, a driven shaft 6, a driven sprocket wheel or gear 7 and brackets 8 attached to the frame of the snowmobile.

The torque responsive variable diameter drive pulley 1 will now be described in detail with reference to FIGS. 2 to 12a inclusive. The variable diameter drive pulley 1 includes a spindle 9 having an axial bore 10 therethrough. The spindle 9 has an enlarged end defining a tapered counterbore 11, a first outside annular shoulder 12, a second outside annular shoulder 13 larger than the first annular shoulder 12 and a cylindrical surface 14 extending between the first and second outside annular shoulders 12 and 13. The other end of the spindle 9 opposite the enlarged end has a portion 15 of reduced diameter. A pulley flange 16 is fixed against the second outside annular shoulder 13 coaxially of the spindle 9 to rotate with the latter and to be held against axial displacement.

Another pulley flange 17 is also coaxially mounted on the spindle 9, as will be explained later. The flanges 16 and 17 have one of their sides facing each other and radially diverging relative to each other to form a V-belt recess for a V-belt 4, as best shown in FIG. 10.

The pulley flange 17 has a hub 18 coaxially mounted on the spindle 9 by an insert 19 arranged to allow both rotational and axial movements of the flange 17. The latter has a counterbore 20 of longer diameter than the cylindrical surface 14, such that the flange 17 will move axially over the latter. The counterbore 20 extends into an annular cavity 21 having a blind or closed end located axially away from the open end of the bore 20. A compression coil spring 22 is inserted into the annular cavity 21 and has one end abutting against the blind end and its other end abutting against an annular seat 23 held against the first outside annular shoulder 12, thereby axially biasing the flange 17 away from the flange 16. On the outer surface of the hub 18, there are provided axial projections forming ramps having cam surfaces 24 spaced angularly and radially and extending in the same axial and circumferential direction relative to the axis of the flange 17 and the spindle 9. An abutment or stop 25 is provided intermediate every two cam surfaces to limit the relative rotation of the flange 17, as will be explained later. The flange 17 has a cylindrical skirt portion 26 extending away from the flange 17, around the hub 18.

A cam-engaging member 27 is provided having a hub portion 28 fixed by a key 29 to the reduced diameter portion 15 of the spindle 9 for rotation with the latter. The cam-engaging member 27 also has fingers or finger portions 30, three in this case, to correspond to and engage the three cam surfaces 24. The finger portions 30 are formed integrally with the hub portion 28, extend axially from one side thereof towards said cam surfaces and are circumferentially arranged to define an annular space 31 into which engages the hub 18 of the axially displaceable pulley flange 17. The free end or cam surface engaging end of each finger portion 30 is suitably profiled to minimize friction with the corresponding cam surface and is preferably provided with a wear and friction reducing cover 32 of suitable plastic, such as nylon.

A chain 33, a wire, or any other suitable pliable tie of appropriate length, is provided for each finger portion 30. Three chains 33 are therefore provided in this case. One end of each chain 33 is attached by a pin 34 extending between a pair of lugs 35 fixed on the outer surface of the corresponding finger portion 30. The other end of each chain 33 is similarly attached by a pin 36 extending between a pair of lugs or bosses 37 fixed against the inside surface of the cylindrical skirt portion 26 of the pulley flange 17.

A cover 38 having a cylindrical edge 39 is fixed by screws 40, or the like expedient, against the end of the hub portion 28 which is axially opposite the finger portions 30.

It must be noted that the cam-engaging member 27 is retained against axial and rotational movements relative to the spindle 9 by the cover 38 and the key 29 respectively. The cam-engaging member 27 and its finger portions 30 therefore bodily rotate with the spindle 9 and the fixed pulley flange 16, and the pulley flange 17 is axially and rotatably movable between the cam-engaging member 27 and the fixed flange 16. The cylindrical edge 39 circumferentially overlaps the edge of the cylindrical skirt portion to define an enclosed space around the cam-engaging member 27, the chains 33, the hub 18 and the axial cam projections thereof. The cylindrical skirt portion 26 and the cylindrical edge 39 are arranged to allow free axial displacement of the movable flange 17.

A bolt 41 is inserted axially through the bore 10 of the spindle 9 and screwed into the tapered and threaded end 42 of a driving shaft, such as shaft 3 in FIG. 1, and a key 43 is provided between the driving shaft and the spindle 9 to fix the latter coaxially to the driving shaft. Although a specific manner of mounting the pulley 1 on a driving shaft has been illustrated, various other means can be used and the spindle 9 can be modified to that effect without departing from the spirit and scope of the invention.

Three finger portions, cam surfaces and chains have been illustrated and described, but this number is not essential and merely results in a preferred arrangement. It is not strictly essential that there be the smae number of finger portions, cam surfaces and chains, as will be understood by any person skilled in the art. Preferably, the axial cam projections, the finger portions and the chains should be angularly spaced apart and arranged to form a symmetrical and dynamically balanced assembly.

When the pulley 1 is in the inoperative position, the relative positions between the finger portions 30, the axial cam surfaces 24 and the chains 33 are substantially as shown in FIGS. 11a and 12a; that is under the biasing action of the coil spring 22, the movable pulley flange 17 is pushed axially away from the fixed flange 16, resulting in a V-belt recess of maximum width between the flanges 16 and 17. In that position, the V-belt is radially near the cylindrical surface 14 of the spindle 9 and rests on a freely rotatable bushing 14', the finger portions 30 have substantially disengaged the ramps defining the cam surfaces 24 and the chains 33 are extended in almost taut condition. Belt 4 is free of flanges 16 and 17 and, therefore, is declutched from the drive pulley.

When the driving shaft 3 and the free end 42 thereof start to accelerate the forward drive, the spindle 9, the cam-engaging member 27 including the finger portions 30 and the fixed flange 16 bodily accelerate therewith in the direction indicated by the arrows in FIGS. 10 and 11. Since the movable flange 17 is not positively driven and is free of the V-belt 4, it rotates at the same speed as spindle 90, because fingers 30 are engaged by stops 25; with increase in speed, centrifugal force causes shortening of chains 33 which produces retardation of movable flange 17 relative to member 27 and the finger portions engage the camming surfaces 24 to produce axial movement of flange 17 towards flange 16. Flange 17 engages and is retarded by belt 4 with a force depending on the torque developed by motor 2. By this camming action, flange 17 is axially pushed towards the fixed flange 16, causing, as is well known in the art, clutching of the drive pulley with the speed ratio belt 4. With increasing speed, the retarding force exerted by the chains assists the torque induced force to thereby progressively change the speed ratio of the transmission. Also, as soon as the pulley starts to rotate, the chains under centrifugal force apply the camming surfaces 24 against the fingers 30.

When and as soon as the driving shaft decelerates, the rotational inertia of the movable flange 17 causes the latter to tend to precede the finger portions 30 and the coil spring 22 causes the movable flange 17 to immediately follow and move axially away from the fixed flange 16, resulting in a substantially immediate response to deceleration. Simultaneously, the bulges or loops of the chains proportionately vanish or decrease. FIGS. 10, 11 and 12 illustrate the above-described accelerated positions.

From the foregoing, it is seen that the drive pulley of the invention is responsive to the difference of torques exerted on cam member 27 by motor 2 and exerted on pulley flange 17 by belt 4, as well as to the rotational speed of the motor, contrary to known drive pulleys which are solely responsive to the variation of rotational speed of the motor. The drive pulley of the invention is preferably used in association with the known cam-operated variable diameter driven pulley, although it could be used with the known spring-loaded variable diameter driven pulley.

The drive pulley of the invention produces less belt slipping than the centrifugally-operated drive pulley---especially at low speed and during acceleration. Also, much quicker vehicle deceleration is obtained.

I claim:

1. A variable diameter drive pulley comprising a pair of flanges coaxially mounted adjacent each other for rotation about a common axis, said flanges having one of their sides forming opposed faces which are radially diverging relative to each other to define a V-belt recess, one of said flanges is rotatably and axially displaceable relative to the other of said flanges, a cam means attached to said one flange, a cam-engaging means fixed to said other flange and arranged for bodily rotation therewith about said axis, said cam means having an axially camming surface engageable by said cam-engaging means upon relative angular retardation of said one flange relative to said other flange to axially displace said one flange towards said other flange, spring means biasing said one flange away from said other flange, and centrifugally responsive weight means urging said one flange in rotation relative to said other flange in a direction to cause angular retardation of said one flange relative to said other flange, and wherein said weight means are a pliable tie means attached at one end to said one flange and at its other end to said cam-engaging means, slackly extending between the same transversely of said common axis.

2. A variable diameter drive pulley as defined in claim 1, wherein said pliable tie means are chains joining said cam-engaging means to angularly spaced-apart points of said one flange.

3. A variable diameter drive pulley comprising a pair of flanges coaxially mounted adjacent each other for rotation about a common axis, said flanges having one of their sides forming opposed faces which are radially diverging relative to each other to define a V-belt recess, one of said flanges is rotatably and axially displaceable relative to the other of said flanges, a cam means attached to said one flange, a cam-engaging means fixed to said other flange and arranged for bodily rotation therewith about said axis, said cam means having an axially camming surface engageable by said cam-engaging means upon relative angular retardation of said one flange relative to said other flange to axially displace said one flange towards said other flange, spring means biasing said one flange away from said other flange, and centrifugally responsive weight means urging said one flange in rotation relative to said other flange in a direction to cause angular retardation of said one flange relative to said other flange, and wherein there are a plurality of camming surfaces defined by axial projections extending on the other side of said one flange, equally angularly spaced-apart and extending in the same axial and circumferential direction relative to said one flange and said axis, and wherein said cam-engaging means is defined by as many finger portions as there are camming surfaces, said finger portions being equally spaced apart and engaging said axial projections.

4. A variable diameter drive pulley as defined in claim 3, further comprising a spindle means defining said common axis, said other flange is fixed to said spindle means for rotation therewith, said finger portions are carried by a hub portion fixed to said spindle means for coaxial rotation therewith, in axially spaced-apart position relative to said other flange, said one flange is mounted rotatably and axially slidable on said spindle means between said hub portion and said other flange, said projections and said finger portions extend axially towards one another, and said spring means biases said projections towards said finger portions.

5. A variable diameter drive pulley as defined in claim 4, wherein said one flange forms a cylindrical skirt portion extending coaxially thereto towards said hub portion and a cover having a cylindrical edge is coaxially fixed to said hub portion with said cylindrical edge circumferentially overlapping the edge of said cylindrical skirt portion to define an enclosed space around said hub portion, said finger portions, and said projections, and said cylindrical skirt portion and cylindrical edge are arranged to allow free axial displacement of said one flange.

6. A variable diameter drive pulley as defined in claim 5, wherein said weight means are chains slackly joining angularly spaced points inside said skirt portion with said finger portions.

7. A variable diameter drive pulley as defined in claim 6, wherein said spindle means is a hollow spindle having an enlarged and counterbored end, defining a first annular outside shoulder and a second annular outside shoulder or larger diameter than said first annular shoulder and spaced axially from the latter, and a cylindrical surface intermediate said first and second annular shoulders, said other flange is fixed against said second annular shoulder, said one flange has a hub having a bore of sufficient size and arranged to engage coaxially around said cylindrical surface when said one flange is axially displaced towards said other flange, said bore of said hub terminates into an annular cavity having a blind end, said spring means is a coil spring inserted in compression between said blind end and said first outside annular shoulder, said finger portions are formed integrally with said hub portion, extend axially from one side thereof and are spaced radially from said spindle to define an annular space around the latter, said hub axially extends from said other side of said one flange and is arranged to slidably engage into said annular space, the counterbored end of said spindle is adapted to engage a free end of a driving shaft and a bolt means is adapted to extend through said spindle and to coaxially fix the latter onto said free end of said driving shaft.

* * * * *